F. PANY.
MACHINE FOR MOLDING DOLLS' HEADS.
APPLICATION FILED JUNE 4, 1914.

1,152,208.

Patented Aug. 31, 1915.
2 SHEETS—SHEET 1.

F. PANY.
MACHINE FOR MOLDING DOLLS' HEADS.
APPLICATION FILED JUNE 4, 1914.

1,152,208.

Patented Aug. 31, 1915.
2 SHEETS—SHEET 2.

WITNESSES:
T. B. Stallman
Wm. J. Cohen

INVENTOR
Ferdinand Pany
BY
Ashley & Heohen
ATTORNEYS

UNITED STATES PATENT OFFICE.

FERDINAND PANY, OF NEW YORK, N. Y., ASSIGNOR OF ONE-HALF TO CHARLES MEDOCK, OF NEW YORK, N. Y.

MACHINE FOR MOLDING DOLLS' HEADS.

1,152,208.  Specification of Letters Patent.  Patented Aug. 31, 1915.

Application filed June 4, 1914. Serial No. 842,815.

*To all whom it may concern:*

Be it known that I, FERDINAND PANY, a subject of the Emperor of Austria-Hungary, and a resident of New York city, in the county of New York and State of New York, have invented certain new and useful Improvements in Machines for Molding Dolls' Heads, of which the following is a specification.

This invention relates to machines for molding dolls' heads, and is particularly directed to improvements in the construction of the mold itself and the mounting thereof upon the machine.

The principal object of this invention is to provide a mold and mounting therefor which will make it possible to operate the machine at a higher speed and to increase the output thereof.

The material used in molding dolls' heads is a composition which must be worked while hot, but the difficulty has been that as soon as the mold attained the temperature of the composition, the latter would adhere to the walls of the mold, so that it was difficult to remove the molded article until the mold cooled off. This, of course, rendered the operation of the machine very slow and cut down its output, especially during the heat of the summer months when the mold itself is at a comparatively high temperature to begin with. Another difficulty has been experienced in connection with the operation of a machine of this character consisting in the deterioration of the mold sections at their meeting edges, due to the hammering occurring when the portions of the mold are forced together. This further reduced the speed of the machine, as it was necessary to cause the sections to approach each other very slowly to avoid in a measure this hammering action. To overcome these difficulties, I provide in the body of each section of the mold a cooling chamber through which the water circulates to cool the sides of the mold and maintain the same constantly at a low temperature. This chamber is formed with an inlet and outlet which are connected by flexible pipes to some source of supply and to a drain whereby the cooling medium is constantly supplied to the mold during the operation of the machine. Also the mold is so mounted that it may move yieldingly under the action of the machine, so that the force of the impact is yieldingly taken up and the hammering avoided.

Various further objects and advantages will more fully appear from the detailed description.

Figure 1:
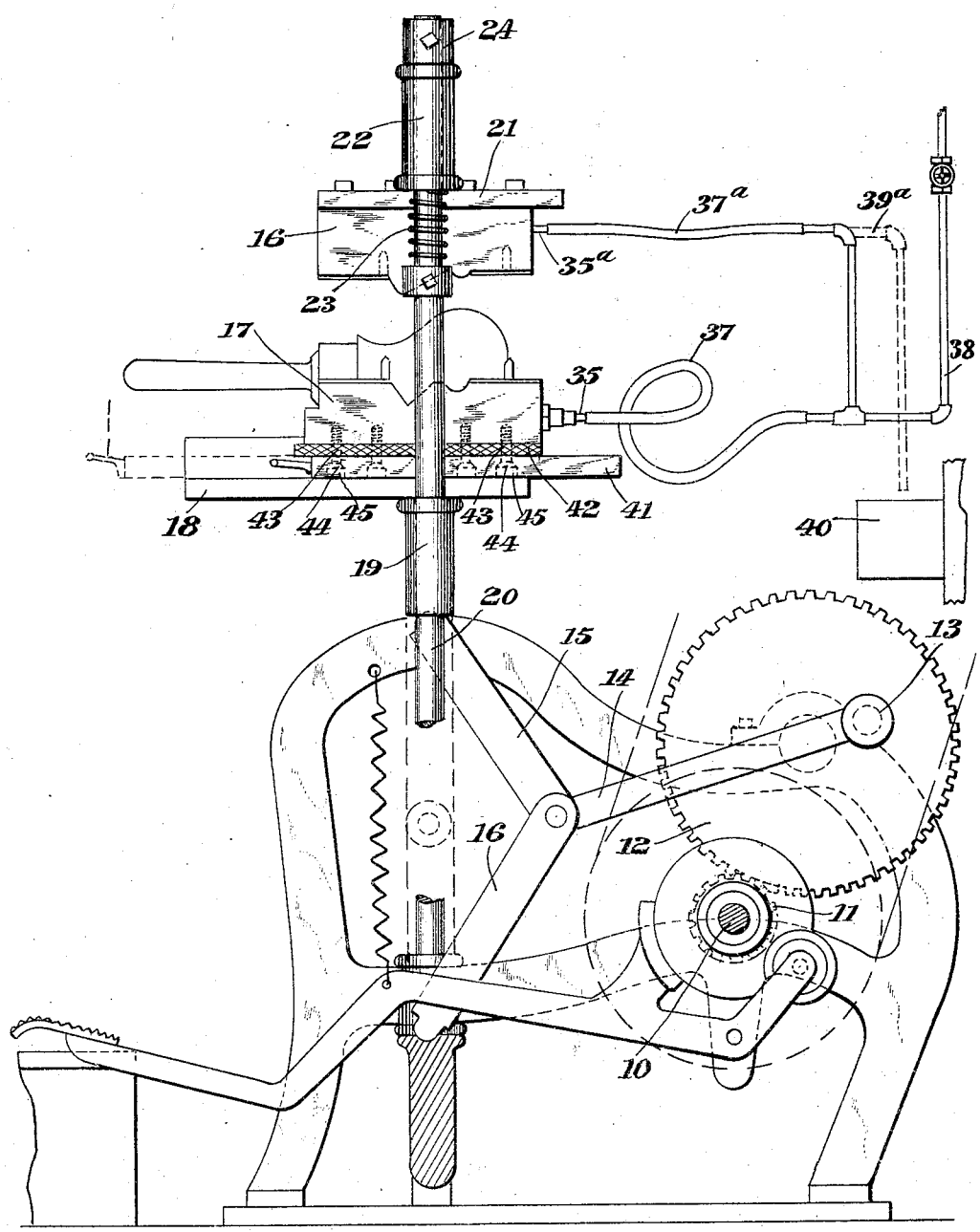
Figure 2:
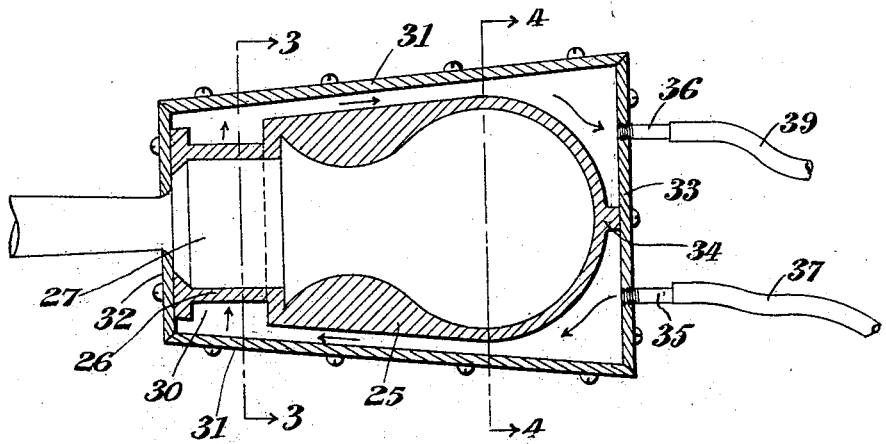
Figure 3:
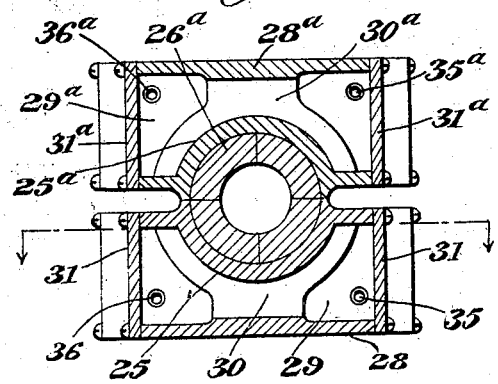
Figure 4:
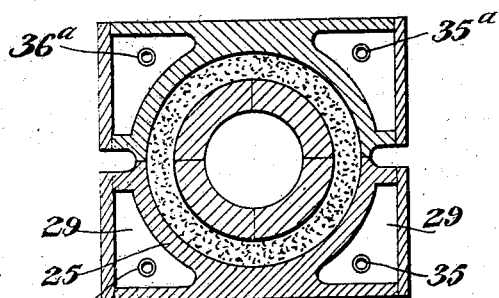

In the drawing illustrating this invention, Figure 1 is a diagrammatic elevation, partly in section, of a machine bearing a mold embodying the invention. Fig. 2 is a longitudinal section of the lower mold member. Figs. 3 and 4 are sections taken respectively on lines 3—3 and 4—4 of Fig. 2.

Referring in detail to the drawings, the machine is driven from any suitable source of power from a shaft 10, having thereon a pinion 11, driving the gear wheel 12, to which is connected a ·crank 13, actuating through a connecting rod 14, the members 15 and 16 of a toggle. The mold proper consists of two sections 16 and 17, one of which, in the present construction the lower one, is actuated by the toggle. Thus, the section 17 is mounted upon a table 18 fixed to the cross head 19, guided upon two posts 20, located on either side of the mold and attached to some stationary part of the framework. The cross head is actuated upward by the toggle to compress the material in the mold so as to conform to the contour thereof. The upper section 16 of the mold is attached to a plate 21, fixed to a cross bar 22, also mounted upon the guide post 20 and held upward by a spring 23, against the collar 24 attached to the upper end of the post. This spring serves to lessen the abruptness with which the mold sections are parted when the doll has been compressed into shape.

I will now describe the improved construction and mounting of the mold sections whereby the output of the machine as well as the life of the mold itself are greatly increased.

Referring particularly to Figs. 2, 3, and 4, it will be noted that the bottom portion of the mold is formed with the interior form portion 25, from which extends the sleeve 26 for receiving the core 27. Between the flat bottom portion 28 of the mold and the form bottom portion 25 is a recess 29 extending along the sides of the mold and continuing through the passage 30 formed under the sleeve 26. This recess is converted into a closed conduit or chamber by the cover plates 31 at each side, and cover plates 32 and 33 at the ends of the mold. A partition wall 34 is formed preferably at the end opposite the handle of the core 27 for dividing the conduit into inlet and discharge sides. An inlet nipple 35 may thus enter the plate 33 at one side of the partition 34, and a discharge nipple 36 extends from the plate 33 at the opposite side of the partition 34. A flexible pipe 37 conducts the cooling liquid to the inlet from some suitable source of supply, as the water pipe 38, and another flexible pipe 39 conducts the liquid from the discharge 36 to some suitable drain 40. The upper section of the mold is similar to the lower section in mechanical details above described, and thus comprises the form portion 25ª, a sleeve portion 26ª, top 28ª and the passage 29ª—30ª, closed by the side plates 31ª and the end plates similar to the end plates 32 and 33 of the bottom section. Flexible pipe sections 37ª and 39ª conduct the incoming and the outflowing water respectively from the water pipe 38 into the drain 40.

I will now describe the improved means whereby the hammering of the mold sections is eliminated and the life thereof accordingly prolonged.

The lower section 17 is mounted upon a plate 41 which slides in guides upon the table 18. Between the plate 41 and the bottom of the mold section is interposed a lining 42 of some resilient material such as rubber or the like, which forms a yielding cushion and takes up the impact against the mating mold section, due to the rapid action of the machine. To maintain the lower section in proper alinement, while being yieldably mounted as above described, pins 43, having heads 44, pass through countersunk perforations 45 in the plate 41 and screw into the bottom of the mold section 17. These pins form guides which maintain the mold against lateral displacement while permitting vertical movement, to take up the force of the impact above stated.

To charge the mold, a sheet is cut from the batch of plastic material which is in a heated condition and wound about the core, the skilled operator being able to determine quite exactly the amount of material necessary to make up the head of the doll, so that there is very slight, if any, overcharge or undercharge. The core thus encircled with the heated plastic material is then placed in the mold and compressed into shape. During this operation, the water flows continuously through the water jacket to cool the charge for the purposes above mentioned.

It will be seen from the above description that I have provided an improved mold and mounting therefor which can be used in a rapidly acting machine to obtain a large output per machine without encountering any difficulty in removing the material from the mold and without injuring the parts of the latter, due to the hammering hitherto encountered. I have found that where previously only 90 heads a day could be produced, I now produce with the same machine 450 heads without the slightest injury to the mold. The material comes out easily, as not only does it not adhere to the walls of the mold by reason of maintaining the latter at a low temperature, but also the meeting edges of the mold sections are kept intact by the improved mounting and the material does not wedge in as has happened with the molds hitherto used. The previous difficulty of wedging was due to the upsetting of the metal along the edges of the mold by reason of the pounding or hammering. It will be seen that according to my invention, this is entirely eliminated.

Having thus described my invention, I claim as new and desire to secure by Letters Patent:

1. In a machine for molding dolls' heads, a movable table, means for actuating the same, a relatively stationary abutment, a two-part mold having the portions thereof attached to said table and abutment, and means for cooling the walls of the mold during the operation of the machine, said means comprising a water chamber formed entirely around the lateral wall of each section of the mold, a partition dividing said chamber, means for conducting a cooling medium into the chamber at one side of the partition, and discharging said medium at the other side of the partition and means for absorbing the shock of the impact of the mold member.

2. In a machine for molding dolls' heads, a movable member, a stationary member, mold sections mounted on said movable and stationary members, means for actuating the movable member toward the stationary member to apply pressure around the material, and means for cooling the sections of the mold while the machine is in operation, comprising a water chamber formed in each section about the sides of the mold, a partition in said chamber, an inlet into the chamber at one side of the partition, and an outlet at the other side of the partition, flexible conduits leading from said inlet and outlet whereby the cooling liquid may be supplied to the chamber while the mold is moving during the operation of the machine and shock absorbers connected to the mold sections to neutralize the force of impact of the mold sections.

3. In a machine for molding dolls' heads, a movable table, a stationary abutment, means for actuating the table, a two-part mold, the portions of which are mounted respectively on the table and abutment, means for cooling each section during the operation of the machine comprising a water chamber formed around the sides of each section, means for supplying a cooling medium to the water chambers, means for resiliently mounting one of the mold sections comprising a yieldable lining interposed between the mold and the support, and means for guiding the corresponding mold section relative to the support while the mold is yielding under the pressure exerted thereon by the actuating means.

4. In a machine for molding dolls' heads, a movable table, a stationary abutment, means for actuating the table, a two-part mold, the portions of which are mounted respectively on the table and abutment, means for cooling each section during the operation of the machine comprising a water chamber formed around the sides of each section, means for supplying a cooling medium to the water chambers, means for resiliently mounting one of the mold sections comprising a yieldable lining interposed between the mold and the support, and a plurality of guide pins extending from the mold through the yielding lining into the support, said pins restraining the mold from lateral movement while permitting vertical movement during the molding operation.

5. A mold for dolls' heads comprising two sections, each of which is provided with a form portion and a sleeve extending therefrom for the reception of the core, one of said sections being resiliently mounted so as to yield when the two sections are brought together and absorb the shock of impact, there being a chamber formed about the sides of the mold extending under the sleeve portion, a partition in the chamber, an inlet at one side of the partition, and an outlet at the other side of the partition.

6. A mold for dolls' heads comprising a sectional form portion, a sleeve extending therefrom, a recess extending about the form portion and under the sleeve forming a chamber, one of the sections being flexibly mounted with respect to the vertical but having no lateral freedom of motion, a partition in said recess, detachable side plates for closing said recess to form a conduit extending substantially entirely around the mold, an inlet on one side of the partition for supplying a cooling medium to said conduit, and an outlet at the other side of the partition to discharge the water from the conduit.

7. A mold for dolls' heads comprising two sections, each of which is provided with a form portion, one of said sections being adapted to reciprocate to and from the other section, said section being resiliently mounted to absorb the shock of impact, and the other section having no freedom of movement in the direction of impact and provided with flexible means whereby it yields in the opposite direction when the two sections are parted from each other.

Signed at New York city, in the county of New York, and State of New York, this 2nd day of June A. D. 1914.

FERDINAND PANY.

Witnesses:
 WM. I. COHEN,
 MINNIE S. MILLER.